United States Patent [19]

Katayama et al.

[11] 4,209,335

[45] Jun. 24, 1980

[54] METHOD AND COMPOSITION, INCLUDING PARTICULAR ADDITIVE FOR HYDRAULIC CEMENT, FOR FIXING WASTE MATTER

[75] Inventors: Ichiro Katayama, Nishinomiya; Hirosuke Kubota, Kawanishi; Mitsuo Mochizuki, Chiba; Kuniyoshi Sakane, Osaka; Toshimichi Mihara, Takatsuki; Tokuzo Kitawaki, Takarazuka, all of Japan

[73] Assignees: Kabushiki Kaisha Takenaka Komuten, Osaka; Kabushiki Kaisha Takenaka Doboku, Tokyo, both of Japan

[21] Appl. No.: 909,233

[22] Filed: May 24, 1978

[30] Foreign Application Priority Data

May 25, 1977 [JP] Japan .................... 52/59848

[51] Int. Cl.² ................... C04B 7/02; C04B 7/35
[52] U.S. Cl. ...................... 106/89; 106/97; 106/314; 106/315
[58] Field of Search ........... 106/76, 97, 314, 315, 106/89

[56] References Cited

U.S. PATENT DOCUMENTS

| 3,425,892 | 2/1969 | Edelson et al. | 106/315 |
| 3,522,068 | 7/1970 | Bastian et al. | 106/97 |
| 3,782,984 | 1/1974 | Allemand et al. | 106/314 |
| 3,782,991 | 1/1974 | Burge | 106/315 |
| 3,837,872 | 9/1974 | Conner | 106/76 |
| 3,947,283 | 3/1976 | Uchikawa et al. | 106/315 |

Primary Examiner—James Poer
Attorney, Agent, or Firm—Edwin E. Greigg

[57] ABSTRACT

Solidification or consolidation, for fixation of various kinds of waste matter, soil etc. containing toxic contaminants affecting ecological system of the environment, by use of composition made up of hydraulic cement and particular additive. The additive essentially contains at least one sulfate, such as aluminum sulfate, alum or iron sulfate, and at least one alkaline metal salt, such as carbonate, bicarbonate or silicate.

21 Claims, 1 Drawing Figure

METHOD AND COMPOSITION, INCLUDING PARTICULAR ADDITIVE FOR HYDRAULIC CEMENT, FOR FIXING WASTE MATTER

BACKGROUND OF THE INVENTION

This invention relates to a method and composition, including particular additive for hydraulic cement, for fixing waste matter, which can consolidate and solidify various waste matter and/or soil, in muddy, powdery or particulate state, containing substance toxic to or affecting the ecological system, thus to fix up the contained toxic substance and to render same harmless to the environment, guaranteeing to attain such aim even in the case where the waste matter and/or soil contain substance as will hamper or inhibit hydraulic cement from hardening by hydration.

Various wastes in muddy state, such as sludges settling down as sedimentation layers of the bottoms of the sea, lakes, rivers or the like, effluent sludges discharged from various industries including pharmaceutical, tanning, paper and pulp manufacturing, wool washing, fermenting, food processing, metal surface processing, plating, ore dressing, coal washing, fume desulfurizing and still other wastes, sewage sludges discharged from sewage processing stations, and yet may others, are in Japanese language referred to generally as "Hedro" of severe public nuisance, making it a grave and urgent social problem of today how to cope with them.

Characteristic generally of such Hedro may be itemized as follows:

(a) They contain large amount of water and it is very difficult to solidify them by dewatering, because of extremely minute particles constituting solid portion of them.

(b) They are often contaminated with substances affecting the environmental ecological system, as heavy metal elements for instance copper, lead, cadmium, arsenic, mercury, hexavalent chromium or the like, and other chronically toxic compounds for instance PCB, PCP, DDT, 2-BHC, Dieldrin, Chlordecone, Mirex, Parathion, cyanic compounds, alkyl-mercury compounds or the like.

(c) They often contain substances as will hamper or inhibit hydraulic cement from hardening by hydration, as such organic substances for instance as saccharides, humins, tannins, fatts and fatty oils, humuses, decomposition products of some kinds of proteins and/or of petroleums, and so forth, compounds of heavy metal elements for instance copper, lead, zinc or the like, some kinds of inorganic or organic acids and the salts thereof, and so forth.

The methods so far tried for solidifying the Hedro of such characteristics are: solidification by natural drying by letting them stand in open air for long period of time, centrifugal separation, forced filtration under vacuum or pressure, consolidation by drainage by means of sand drain method or card-board wicks method, and so forth. However, the intended dewatering and solidification is quite difficult with such methods, as has already been mentioned under item (a), and it is fundamentally impossible to fix up the toxic contaminants of the Hedro as mentioned under item (b). There has therefore been proposed and has actually been used a method of admixing hydraulic cement into the Hedro thus to solidify same making use of the hydration reaction and at the same time confining and fixing up the toxic contaminants within the consolidated mass, which mass may be used for reclamation, filling, banking, polder, land improvement etc. or may likewise be reused as a material for some useful formed objects. Howver, it is not always easy to effectively fix up and confine the toxic contaminants in the Hedro by the consolidation simply by admixing the hydraulic cement, and there have in fact often been the cases where the problem of the secondary pollution on account that redissolution of the said contaminants again into the environment can not be eliminated. If the substances mentioned under item (c), namely as will hamper the hydraulic cement from hardening by hydration, are contained in the Hedro, the difficulty of confining the toxic contaminants has accordingly been greater because of imperfection or even total failure of the solidification of such Hedro.

In view thereof, there have recently been proposed various kinds of additives to be used with the hydraulic cement for enhancing the consolidation effect, or provided a special type of cement having a higher alumina content. In the former, it is however still in a primitive stage in selecting out the proper additives, thus failing to pinpoint the effective ones, especially with respect to the wastes as are the object of application of this invention. In the latter, on the other hand, it is still far from being economically feasible.

Just like the Hedro mentioned above, powdery or particulate wastes such as incinerator ashes discharged from waste incinerating appliances, electrostatic precipitator dusts, etc. also often hamper the hydraulic cement from hardening by hydration and often contain substances affecting the environmental ecological system, thus similarly causing difficulty in fixing and rendering them harmless by the treatment using the hydraulic cement.

Similar is further true also as to organic soils naturally often seen, such as peat, organic type special Japanese volcanic soil "Kuroboku", marl, humic soil, etc. Thus, such organic soils are generally of high water content, higher compressibility and poor bearing power and so it is desired to improve their civil engineering characteristics for instance by admixing soil cement in order to utilize them as civil engineering material, but the conventional soil cement is hampered, by the organic content in such organic soils, from hardening by hydration, and no practically satisfactory soil cement has as yet been available.

In view of the above, it is quite important and urgent as the problem of today, playing a role of a fundamental stem in coping with the social needs for suppressing pollution of the environment, reusing the wastes and making best use of the unutilized resources, to develop the technique with respect to fixing up and rendering harmless not only the so-called Hedro but also various kinds of noxious wastes and organic soils (which shall in all be referred to hereinafter in this specification as "noxious wasted etc.").

This invention relates to solidification of such noxious wastes etc. and is based on the same principle as in the prior art so long as utilizing the hydraulic cement as the main solidifying agent and using additive for assisting same, but is quite novel and original in selection and combination of the additive, thereby resulting in various synergistic effects advantageous for the intended purpose.

As the hydraulic cement playing the role of the main solidifying agent in this invention, it is preferable, in view both of the effect and economy, to use portland cement, but it is as well possible to use portland blast-furnace cement, silica cement, fly ash cement, pozzolan cement, etc. The additive used together with such hydraulic cement contains at least the following ingredients A and B:

Ingredient A: At least one sulfate selected from the group consisting of aluminium sulfate, alum, ferrous sulfate and ferric sulfate.

Ingredient B: At least one alkaline metal salt selected from the group consisting of alkaline metal carbonate, bicarbonate and silicate.

In the case where the noxious wastes etc. to be solidified contain simply the substances affecting the ecological system but none or very little, if any, of the substances hampering the hydraulic cement from hardening by hydration, then the additive consisting of the above-mentioned Ingredients A and B will be effective in attaining the purpose to the degree as intended, but it is generally the case that the substances hampering the hardening by hydration are also contained, and then the following Ingredient C should further be added to the said additive used for this invention:

Ingredient C: Hydroxide or oxide of an alkali earth metal.

In practicing this invention, the noxious wastes etc. are admixed with the hydraulic cement, the said additive, and water (incase where water is insufficiently contained in the noxious wastes etc.) or solid filler for instance soil or sand (in case where too much water is contained in the noxious wastes etc.) as may be added at needs per the parenthesized remarks, and the admixture is cured to a proper curing age, thus to cause hardening by hydration ultimately to be transformed irreversibly to a water-insoluble, nondecaying consolidated mass, in which the toxic contaminants contained in the noxious wastes etc. have very effectively been fixed up. Any order of successively admixing the ingredients of the said additive is possible, but it is generally the tendency that admixing first the Ingredient A of the additive causes slow setting, while admixing first the Ingredient B causes quick setting.

BRIEF DESCRIPTION OF THE DRAWING

The single view drawing shows a chart of X-ray refraction obtained with respect to a tested sample (corresponding to Test B-4 in Example 2 to be described later) prepared by admixing and kneading up the wastes hardening agent according to this invention with dewatered cake of sewage sludge and tested upon solidification at the curing age of 28 days.

DESCRIPTION OF THE PREFERRED EMBODIMENTS

As to the reaction mechanism involving interaction of the components in the process of solidifying the noxious wastes etc. by hydration of hydraulic cement under presence of the additive according to this invention, there are still many particulars not clear as yet, but described hereunder is what is presumed as such by the inventors and what has almost been ascertained or confirmed as true by a series of experiments.

First, so to the effect of employing together the hydraulic cement and the Ingredients A and B of the additive, the following may generally be said, though there are still left some points not very definitive, judging from the entire results of chemical tests, electron-microscopic observation, X-ray refraction analyses, infrared absorption spectrum analyses, dynamical tests, toxic contaminants leachate tests and so forth. Thus the Ingredients A and B undergo double decomposition to yield:

(1) alkaline metal sulfate,
(2) hydroxide of aluminium or of iron, or silica, in colloidal state, (particular product depending upon what are selected as the Ingredients A and B, and the product being hereinafter referred to in general as "colloidal product") and
(3) carbon dioxide (not yielded if alkaline metal silicate is selected as the Ingredient B), which will bring forth the favorable effects in many ways as now described hereunder:

The alkaline metal sulfate (1) will in turn react with calcium hydroxide liberated in the process of hydration of the hydraulic cement (also with the Ingredient C in the case the Ingredient C is positively added to the additive), to yield calcium sulfate, which will then react further with hydrate of tri-calcium aluminate yielded in the process of hydration of the hydraulic cement, thus to ultimately yield ettringite. When aluminium sulfate or alum is selected as the Ingredient A, such will also ultimately yield ettringite. Thusly yielded ettringite, taking-in large amount of water as crystal water therefor, will serve for solidifying the noxious wastes etc., confining within the matrix of the crystalline texture thereof the toxic contaminants of such noxious wastes etc. If alkaline metal carbonate or bicarbonate is selected as the Ingredients B, then calcium alumino-carbonate is yielded intermediately, which will also be ultimately converted to ettringite, thus with the effect same as above.

The colloidal product (2) is very active hydrosol or hydrogel of nascent state, which will by nature confine within the colloidal bulk the toxic contaminants of the noxious wastes etc. by ion-exchanging, absorbing or coaggulating action and so forth and which will ultimately by converted to solid calcium compound or the like by bonding with calcium hydroxide liberated in the process of hydration of the hydraulic cement (also with the Ingredient C in the case the Ingredient C is positively added to the additive), thus contributing to solidify the noxious wastes etc., thereby fixing the toxic contaminants thereof. Furthermore, if ferrous sulfate is selected as the Ingredient A, there will be an effect, in addition to the property of the colloidal product of fixing up the toxic contaminants, of reducing property of the ferrous sulfate, which is thus conspicuously effective in fixing up even such toxic contaminants for instance as hexavalent chromium, as are hard to fix up simply by means of the hydraulic cement, and which is also effective, though the reason therefor is not very clear, even in fixing up organic toxic contaminants (particularly chlorinated organic compounds for instance as PCB, chlordecone etc.).

The carbon dioxide (3) will be caught and absorbed in the process of hydration of the hydraulic cement or absorbed by the Ingredient C in the case the Ingredient C is positively added to the additive, thus to ultimately form calcite or the like, thereby contributing to enhance the fixing up property. It is here assumed that the carbon dioxide will first serve catalytically for enhancing gellation of the colloidal product (2) and then alter, in converting into calcite or the like, firmly protect the gel, thus resulting in the said very strong fixing up property. If alkaline metal bicarbonate is selected as Ingredient B, considerable increase in liberating carbon dioxide gas will contribute, besides the abovementioned fixation enhancing effect, also to make porous the solidified mass. Described above are the main or primary reactions, though there will presumably be further reactions of secondary nature to occur in between each of the Ingredients A and B on one hand and the Ingredient C on the other hand. However, if such by-reactions may actually occur, the ultimate reaction product or products will yet remain same just as the products of the said main reactions.

Mention is now made to the effect of the Ingredient C which is preferably added as a constituent of the additive according to this invention. Generally in the process of hardening by hydration of each clinker component of hydraulic cement for instance as portland cement, alite and belite with liberation of calcium hydroxide are comparatively sensitive to be affected by the substance hampering the hydration reaction, as may be contained in the noxious wastes etc., there being a hypothesis stating the reason therefor in such manner that the reaction product of the said liberated calcium hodroxide and the hydration-hampering substance covers up the outer surface of the cement particles thus to hindering further proceeding of the hydration reaction. Approval of this hypothesis leads to a concept of the countermeasure of blocking up the hydration-hampering substance prior to, or at as early a stage as possible of, starting the hydration of the hydraulic cement. Expected as such positive blocking means is indeed the function of the Ingredient C as added to the additive according to this invention. Namely, assumption has been made to the effect that hydroxide or oxide of alkali earth metal will in the water phase be bonded or combined in an early stage with the hydration-hampering substance contained in the noxious wastes etc. thus contributing to kill the chance of growth of such hydration-hampering substance layer covering up the cement particle. A good number of experimental results in support of this assumption have been obtained with the experiments done by the present inventors, and it has thus been confirmed that such blocking up of the hydration-hampering substance makes the normal hydration of the hydraulic cement smooth and easy to occur, to therefore contribute to the strength-development of the solidified mass. Details of such experiments shall later be described as examples in this specification.

In practice, the said Ingredient C may either partly or totally be provided or supplied as contained in the incinerated ash of sewage sludge, and particular mention is now made with reference to the merit of such use. Amount of sewage sludge has recently been more and more increasing in consequence of pervasion of the sewage system, causing the actual situation where it exceeds the limit of natural purification capacity of the environment and thus it can not be neglected as a source of environmental pollution. As a countermeasure, it has been widely adopted to obtain dewatered cake by filtering the sewage sludge and further to incinerate the cake into ash as is easier to discard or to dispose of. However, there remains even with adoption of such measure still unsolved the persistent problem of harmfulness of heavy metal elements in the incinerated ash and of causing secondary pollution of flying around in the ambient air of a portion of such incinerated ash itself. According to this invention, good use is made of such incinerated ash of the sewage sludge as the source of the said Ingredient C, thus it is quite advantageous and may in a way be said to have turned a misfortune into a blessing. In general, the main components of the incinerated ash of the sewage sludge are clay minerals on one hand, which are made highly amorphous by heated dewatering in the process of incinerating the dewatered cake of the sewage sludge, and calcium oxide on the other hand, which is formed by thermal decomposition of slaked lime used as filtrationassisting agent in the process of filtering the sewage sludge. On account of such yielding process, the ash is obtained in powdery form of very minute, highly active particles. Being in such state, the incinerated ash of the sewage sludge is remarkably effective for enhancing the solidification particularly of the Hedro of high water content or of the organic soil, since each clay mineral particle of such ash will adsorb or adsorb good many water molecules on the surface and also inter-crystal-lattice region thereof and since calcium oxide of such ash will also absorb good amount of water as needed for the slaking of itself. It is also assumed that the clay minerals will enhance, on account of pozzolanic reaction of themselves as will proceed in pace with becoming amorphous, the property of self-hardening, which will further contribute to still better solidification. It is yet more to be noted that the said slaking of calcium oxide yields calcium hydroxide, which has, as already described, the effect of blocking up the substance as would hamper hydration reaction of the hydraulic cement. All these effects as mentioned above will thus function in cooperation for making the advantage of this invention quite prominent and conspicuous.

Mention is now made as to optimal amount of each of the ingredients of the additive to be used according to this invention for the hydraulic cement. It has indeed been found, putting together the results of good many experiments performed by the present inventors and judging therefrom, that there are surely a train of indications or evidences confirming the technical concepts of this invention, which lead to the general principles with respect to the optimal amount of each of the said Ingredients A, B and C, as may be summarized as:

Principle 1: Amounts of the Ingredients A and B should mutually be close to satisfy the stoichiometric proportion.

Principle 2: Amount of the Ingredient C should at least be the sum of the amounts stoichiometrically calculated for reactions with the existing Ingredients A and B, respectively.

Principle 3: Ratio of the sum of the amounts of the Ingredients A and B to the amount of the hydraulic cement, calculated on anhydride basis, should be within the range of 5-30%.

Optimal amounts of the Ingredients A, B and C in the additive to be used according to this invention for the hydraulic cement can be determined on the basis of these principles, as may properly be modified depending upon: the particular type of the hydraulic cement as actually used; water content, contents of toxic contaminants, hydration-hampering substances and/or substances already initially present as same in nature as the Ingredients A, B and C, contained in the noxious wastes etc.; as well as the properties particularly required or desired for the ultimate solidified mass. Thus, in the case where the noxious wastes etc. are for instance the dewatered cake of the sewage sludge or the like, containing therein good amount of lime used as filtration-assisting agent, then positive addition of the Ingredient C may almost be dispensed with. Similarly, in the case where the noxious wastes etc. are sludge of the process of acid-washing the metals, sludge of the fume-desulfurizing process, for the like, they often contain lime used in excess of the exact amount required for the neutralization, or contain gypsum and/or other metal salts yielded as the product of the neutralization, and so the proportion of the amounts of the said positively added ingredients may suitably be modified according to the amounts and chemical properties of such substances as actually contained there.

It should as well be noted that further substances may advantageously be added to the additive used according to this invention for the hydraulic cement, for obtaining the ordinary effect thereof well-known in the art, such for instance as water-reducing agents, setting accelerators, setting retarders, foaming agents, form initiating agents, waterproofing agents, colorants, mildewproofing agents, antibacterial agents, fibrous reinforcement materials, fillers, polymeric admixtures, pozzolanic admixtures, ion-blocking agents (e.g. metallic-ion-blocking agents such as chelate compounds, sulfides, polysulfides etc.), surface active agents, expansive admixtures and so forth, as conventionally used as cement additives or cement admixtures.

This invention is further illustrated by the typical examples which follow, but this invention is by no means limited thereto.

EXAMPLE 1

An experiment was conducted to solidify effluent sludge of a food processing plant containing considerable organic matter hampering hydraulic cement from hardening by hydration, such as saccharides or the like. The sludge had the water content of 91%, the weight reduction upon heating (for 30 minutes at 800° C.) of 70% and the pH of 6.7, while the substances used for solidifying same consisted of: normal portland cement as the hydraulic cement; aluminium sulfate (anhydride: designated hereinafter as $Al_2(SO_4)_3$) as the Ingredient A of the additive therefor; soda ash (designated hereinafter as $Na_2CO_3$) as the Ingredient B thereof; and slaked lime (designated hereinafter as $Ca(OH)_2$) as the Ingredient C thereof. Tests were made by admixing various proportions of the solidifying substances, respectively, with 1 kg of the sludge and kneading them up, then preparing with the admixture the testing samples in proper accordance with what is prescribed in JIS (i.e. Japanese Industrial Standard) A 1132 for the "Method of making and curing concrete specimens" and ultimately measuring the unconfined compressive strength of the testing samples at the curing ages of one week and four weeks, respectively, in accordance with the method prescribed in JIS A 1108 for the "Method of test for compressive strength of concrete". The proportion of the said $Al_2(SO_4)_3$ and $Na_2CO_3$ was set in this Example as corresponding to the stoichiometric ratio (namely 1:3 in mol ratio) and the amount as actually used was designed in such manner that the total weight of them replaces the same weight of the cement, more specifically 23% of the total weight of the cement as used in the case where the cement was the sole solidifying agent. On the other hand, the amount of the said $Ca(OH)_2$ was serially increased in each test step of this Example, so as to enable evaluation of the effect of the amount of the $Ca(OH)_2$ actually used in said each test step upon blocking the substances in the sludge, hampering the cement from hardening by hydration, and thus upon the solidification, in both cases of solely with the cement on one hand and under copresence of the said various amount of $Al_2(SO_4)_3$ and $Na_2CO_3$ together with the cement. Test results of this Example are shown in Table 1.

Table 1

| Test number | Amount of the sludge used (g) | Amount of the cement used (g) | Amount of the additive used (g) | | | Unconfined compressive strength (kg/cm$^2$) | |
|---|---|---|---|---|---|---|---|
| | | | Ingredient (A) $Al(SO_4)_3$ | Ingredient (B) $Na_2CO_3$ | Ingredient (C) $Ca(OH)_2$ | Curing age 7 days | Curing age 28 days |
| A.1 | 1,000 | 300 | 0 | 0 | 0 | not solidified | not solidified |
| A.2 | 1,000 | 300 | 0 | 0 | 100 | 0.4 | 0.8 |
| A.3 | 1,000 | 231 | 35.9 | 33.3 | 0 | 0.2 | 0.3 |
| A.4 | 1,000 | 231 | 35.8 | 33.3 | 50 | 0.2 | 0.3 |
| A.5 | 1,000 | 231 | 35.9 | 33.3 | 80 | 0.9 | 1.4 |
| A.6 | 1,000 | 231 | 35.9 | 33.3 | 100 | 8.6 | 13.2 |
| A.7 | 1,000 | 231 | 35.9 | 33.3 | 130 | 10.5 | 15.8 |
| A.8 | 1,000 | 231 | 35.9 | 33.3 | 150 | 11.1 | 16.2 |

From the test results shown in this Table 1, it is seen as follows:

(1) The sludge contains so much amount of substances hampering the cement from hardening by hydration that simple admixture of the cement alone in the amount corresponding to 30% of the sludge does not lead to solidification, thus failing to measure any strength (Test A-1).

(2) If $Ca(OH)_2$ in the amount corresponding to 10% of the sludge is further admixed in addition to the cement as used in item (1) supra, solidification can then proceed even with such addition alone to show a degree of the strength, thus evidencing that the said $Ca(OH)_2$ so added blocks the substances in the sludge hampering the cement from hardening by hydration (Test A-2), and (3) If 23% of the cement used in item (1) supra is replaced by $Al_2(SO_4)_3$ and $Na_2CO_3$ in the same total amount and in proportion corresponding to the stoichiometric ratio, and further addition is made thereto of $Ca(OH)_2$ in the various amount serially increased from one step to another, then the test results show an interesting tendency. Namely, no remarkable enhancement of the strength is seen so long as $Ca(OH)_2$ is used in the amount not exceeding 8% of the sludge (Test A-3 through A-5), but there is a sharp rise of the strength in the further amount range of 8–13% thereof (Tests A-5 through A-7), while the strength enhancement shows a saturation phenomenon in the amount range thereof beyond that range (Tests A-7 to A-8). From such tendency, it is assumed:

(i) Of the so added $Ca(OH)_2$, at least an amount corresponding to about 8% of the sludge (i.e. 80 g as used in the step of Test A-5) is consumed or required to block up the substances in the sludge hampering the cement from hardening by hydration.

(ii) A portion of the amount thereof used in addition thereto (i.e. the balance of 50 g between the amounts thereof used in Test A-5 and A-7) takes part in the hardening reaction instituted under co-presence of $Al_2(SO_4)_3$ and $Na_2CO_3$ (the stoichiometric amount of $Ca(OH)_2$ for the total sum of the used 35.9 g of $Al_2(SO_4)_3$ and 33.3 g of $Na_2CO_3$ being 46.5 g, which is close to the said balance of 50 g), and (iii) The rest portion of the said amount of $Ca(OH)_2$ used in addition to item (1) supra (i.e. the balance between the amounts thereof used in Tests A-7 and A-8) no longer contributes very much to enhancing the solidifying effect (Test A-8).

EXAMPLE 2

Experiments were conducted to solidify two kinds of sludges both containing considerable organic matter hampering hydraulic cement from hardening by hydration. One of the sludges was in fact the dewatered cake of the sewage sludge discharged from a sewage processing station, containing lime already as used as assisting agent for filtration in the amount of about 6% as calculated as $Ca(OH)_2$, and had the water content of 84%, the weight reduction upon heating (for 30 minutes at 800° C.) of 41% and the pH of 12.2. The other sludge was the same food processing plant effluent sludge as used in Example 1. The substances used for the solidification, as well as the methods of preparing the test samples for testing the strength of the solidified mass and of measuring the strength were same as in Example 1. However, the Ingredients A and B (i.e. $Al_2(SO_4)_3$ and $Na_2CO_3$, respectively,) of the additive were used in this Example in such proportion, as seen in Table 2, that the total sum of them remains same in ratio to the amount of the cement used but that the mol ratio of them was serially changed in order to check the influence thereof and to know the optimal proportion thereof. In view further that it fits the purpose to equalize the effective amount of the Ingredient C (i.e. $Ca(OH)_2$) ultimately present, further positive addition thereof to the dewatered cake of the sewage sludge initially containing already considerable $Ca(OH)_2$ as mentioned above was abstained, while in all the test with respect to the food processing plant effluent sludge, $Ca(OH)_2$ in the amount corresponding to 10% of the sludge was used as the ingredient of the additive. Test results of this Example, for both of the two kinds of sludges, are shown en bloc in Table 2.

Table 2

| Kind of sludge | Test number | Amount of sludge used (g) | Amount of cement used (g) | Amount of the additive used (g) | | | Mol ratio of Ingredient A:B | Unconfined Compressive strength (kg/cm²) | |
|---|---|---|---|---|---|---|---|---|---|
| | | | | Ingredient (A) $Al_2(SO_4)_3$ | Ingredient (B) $Na_2CO_3$ | Ingredient (C) $Ca(OH)_2$ | | Curing age 7 days | Curing age 28 days |
| Dewatered cake of sewage sludge | B.1 | 1,000 | 300 | 0 | 0 | — | — | not solidified | not solidified |
| | B.2 | 1,000 | 230 | 0 | 70 | — | $Na_2CO_3$ alone | 6.2 | 8.5 |
| | B.3 | 1,000 | 230 | 18 | 52 | — | 1:9 | 12.4 | 14.5 |
| | B.4 | 1,000 | 230 | 36 | 34 | — | 1:3 | 15.1 | 18.4 |
| | B.5 | 1,000 | 230 | 53 | 17 | — | 1:1 | 2.6 | 3.8 |
| | B.6 | 1,000 | 230 | 70 | 0 | — | $Al_2(SO_4)_3$ alone | 4.5 | 5.7 |
| Food processing plant effluent sludge | C.1 | 1,000 | 300 | 0 | 0 | 0 | — | not solidified | not solidified |
| | C.2 | 1,000 | 230 | 0 | 70 | 100 | $Na_2CO_3$ alone | 1.9 | 3.8 |
| | C.3 | 1,000 | 230 | 18 | 52 | 100 | 1:9 | 3.6 | 7.2 |
| | C.4 | 1,000 | 230 | 36 | 34 | 100 | 1:3 | 8.2 | 12.7 |
| | C.5 | 1,000 | 230 | 53 | 17 | 100 | 1:1 | 0.6 | 0.9 |
| | C.6 | 1,000 | 230 | 70 | 0 | 100 | $Al_2(SO_4)_3$ alone | 1.5 | 1.9 |

From the test results shown in this Table 2, it is seen as follows:

(1) The dewatered cake of sewage sludge, containing $Ca(OH)_2$ already initially, shows a degree of solidification effect even with use simply of the cement alone, with such $Ca(OH)_2$ functioning for blocking the substances hampering the cement from hardening by hydration (Test B-1).

Figure 1:
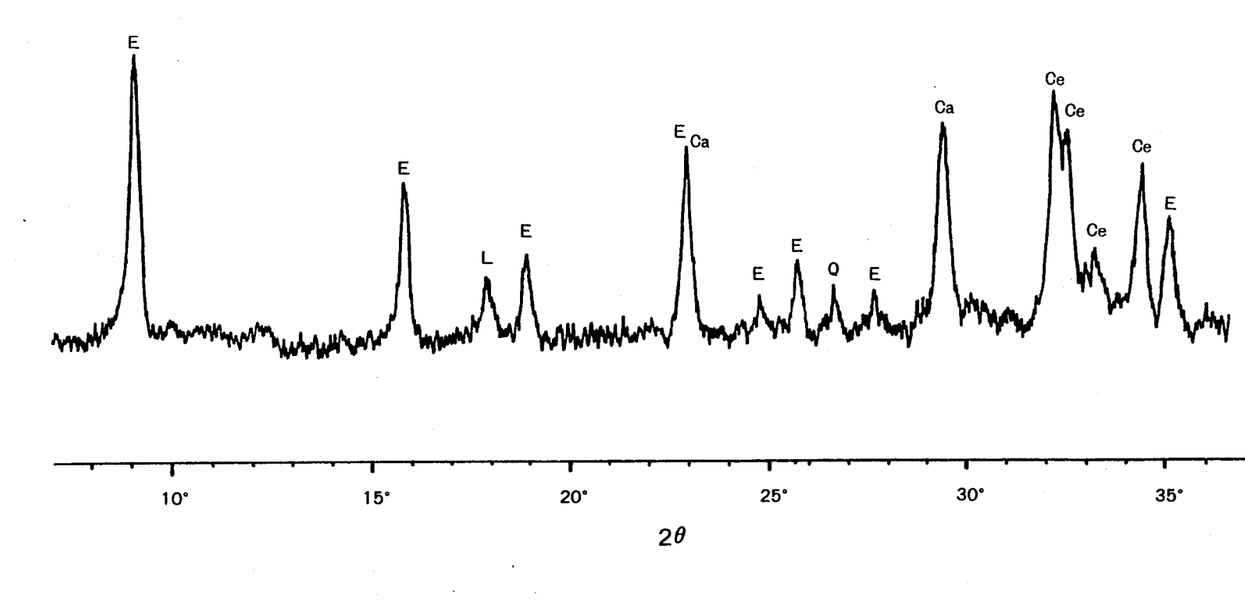

(2) The food processing plant effluent sludge, containing initially no $Ca(OH)_2$, is straightforwardly affected by the substances hampering the cement from hardening by hydration, when the cement is simply used alone, thus failing to solidify at all (Test C-1), and (3) The proportion of the Ingredients A and B optimal for solidifying effect is approximately the stoichiometric proportion thereof (namely 1:3 in mol ratio), and the lower and lower becomes the solidifying effect as the farther and farther departs the proportion therefrom. As a reference material, X-ray refraction chart is shown in the accompanying drawing with respect to the solidified sample of Test B-4, satisfying the said optimal stroichiometric proportion of the two ingredients, at the curing age of 28 days, which chart evidences remarkable yield of ettringite (with symbols in the chart given: E for the peaks inherent to ettringite, L for calcium hydroxide, Ce for unhydrated cement, Ca for calcium carbonate and Q for quartz).

EXAMPLE 3

An experiment was conducted to establish the optimal proportion of the Ingredient C of the additive relative to the total sum of the Ingredients A and B. As an object to be solidified, an artificial Hedro was prepared by adding water to kaolin to make the water content of 70% and by kneading up the mixture. Substances used for solidifying same consisted of: normal portland cement as the hydraulic cement; $Al_2(SO_4)_3$ as the Ingredient A of the additive therefor; $Na_2CO_3$ as the Ingredient B thereof; and $Ca(OH)_2$ as the Ingredient C thereof. Total sum of the amount of all these solidifying substances used in this Experiment was made always to be about 22% of the said artificial Hedro throughout all the tests. Furthermore, the total sum of the used additive relative to the amount of the cement was also made always same throughout all the tests, namely with the total additive amount in about 33% of the amount of the cement. In such additive, proportion of the Ingredients A and B were kept corresponding to the stoichiometric mutual proportion (namely 1:3 in mol ratio) while amount of the Ingredient C was serially changed as represented by the value X, which means to use X times as much amount thereof as compared to the total stoichiometric proportion corresponding to the sum of the Ingredients A and B, and which value X was adopted in five different levels as seen in Table 3. The methods of presparing the samples for testing the strength of the solidified mass and of measuring the strength were same as in Example 1. Test results of this Example are shown in Table 3.

EXAMPLE 4

An experiment was conducted to ascertain the effect of the solidifying composition according to this invention admixed to the "Kuroboku", a particular type of volcanic ash soil containing organic matter, (with 40.3% of weight reduction upon heating for 30 minutes at 800° C.) available in Tochigi Prefecture at the central portion of the mainland Japan, in the intention of improving same by the known technique of soil cement method for adaptation to the use as subbase course material. Substances used for solidifying same consisted of: normal portland cement as the hydraulic cement; $Al_2(SO_4)_3$ as the Ingredient A of the additive therefor; $Na_2CO_3$ as the Ingredient B thereof; and $Ca(OH)_2$ as the Ingredient C thereof. Proportion of such solidifying substances relative to the Kuroboku was changed in six different levels namely:

(i) Simply the cement alone was added in such relative amount of 8%.

(ii) In addition to the cement in the same amount as in item (i) supra, $Ca(OH)_2$ is further added in such relative amount of 4%. and (iii) Of the cement of item (i) supra, 17% of such amount used was replaced by a mixture of $Al_2(SO_4)_3$ and $Na_2CO_3$ mutually in the stoichiometric proportion, and in addition thereto $Ca(OH)_2$ is further added in the amount serially changed in four different levels as seen in Table 4.

Water was added always in the same proportion of 16% of the total sum of the Kuroboku and such solidifying substances, throughout all the tests in this Experi- Table 3

| Test number | Amount of the artificial Hedro used (g) | Amount of the cement used (g) | Amount of the additive used (g) | | | Level value of amount of Ingredient C used (x) | Unconfined compressive strength (kg/cm$^2$) | |
|---|---|---|---|---|---|---|---|---|
| | | | Ingredient (A) $Al_2(SO_4)_3$ | Ingredient (B) $Na_2CO_3$ | Ingredient (C) $Ca_2(OH)_2$ | | Curing age 7 days | Curing age 28 days |
| D.1 | 1,000 | 167 | 29.1 | 26.6 | 0 | 0 | 0.3 | 0.6 |
| D.2 | 1,000 | 167 | 26.2 | 23.9 | 5.6 | 0.25 | 0.4 | 0.8 |
| D.3 | 1,000 | 167 | 23.3 | 21.2 | 11.2 | 0.5 | 1.0 | 1.8 |
| D.4 | 1,000 | 167 | 17.4 | 15.9 | 22.4 | 1.0 | 3.2 | 5.6 |
| D.5 | 1,000 | 167 | 11.5 | 10.6 | 33.6 | 1.5 | 3.0 | 4.9 |

From the test results shown in this Table 3, it is seen as follows: Namely, proportion of the Ingredient C of the additive relative to the total sum of the Ingredients A and B is optimal to show the best solidification effect, when it is close to satisfy the stoichiometric relationship therebetween, thus when approximately X=1 (Test D-4), and the lower and lower becomes the solidification effect as the farther and farther departs the proportion on the side X<1 (Tests D-1 through D-3), while the solidification effect shows somewhat like the saturation phenomenon when the proportion departs on the side X>1 (Test D-5).

ment. With thusly prepared compositions, test samples were prepared by compaction and molding in proper accordance with what is prescribed in JIS A 1210 for the "Method of test for moisture-density relations of soils using rammer", and they were cured first in the wet air of not less than 80% relative humidity at 20±2° C. until the cruing age of 6 days and then in the water also at 20±2° C. for further curing age period. Unconfined compressive strengths of such testing samples were measured at the curing ages of one week and four weeks, respectively. Test results of this Example are shown in Table 4.

Table 4

| Test number | Amount of Kuroboku used (g) | Amount of cement used (g) | Amount of the additive used (g) | | | Unconfined compressive strength (kg/cm$^2$) | |
|---|---|---|---|---|---|---|---|
| | | | Ingredient (A) $Al_2(SO_4)_3$ | Ingredient (B) $Na_2CO_3$ | Ingredient (C) $Ca(OH)_2$ | Curing age 7 days | Curing age 28 days |
| E.1 | 1,000 | 80 | 0 | 0 | 0 | not solidified | 0.2 |

Table 4-continued

| Test number | Amount of Kuroboku used (g) | Amount of cement used (g) | Amount of the additive used (g) Ingredient (A) $Al_2(SO_4)_3$ | Ingredient (B) $Na_2CO_3$ | Ingredient (C) $Ca(OH)_2$ | Unconfined compressive strength (kg/cm$^2$) Curing age 7 days | Curing age 28 days |
|---|---|---|---|---|---|---|---|
| E.2 | 1,000 | 80 | 0 | 0 | 40 | 0.1 | 0.6 |
| E.3 | 1,000 | 66.4 | 6.9 | 6.4 | 0 | 0.2 | 0.7 |
| E.4 | 1,000 | 66.4 | 6.9 | 6.4 | 20 | 0.3 | 0.9 |
| E.5 | 1,000 | 66.4 | 6.9 | 6.4 | 40 | 12.2 | 15.3 |
| E.6 | 1,000 | 66.4 | 6.9 | 6.4 | 60 | 13.1 | 16.2 |

From the test results shown in this Table 4, it is seen as follows:

(1) By simply admixing the cement alone with the Kuroboku in the amount of 8% of this latter, solidification strength can hardly be expected, because of the organic matter contained in the Kuroboku hampering the cement from hardening by hydration (Test E-1).

(2) A degree of such strength comes to emerge if to the Kuroboku there are admixed the cement in the amount of 8% thereof and furthermore $Ca(OH)_2$ in the amount of 4% thereof. However, no remarkable effect is seen with such admixing alone (Test E-2). and (3) Together with replacing 17% of the amount of the cement used in item (1) supra by a mixture of $Al_2(SO_4)_3$ and $Na_2CO_3$ mutually in the stoichiometric proportion, if $Ca(OH)_2$ is further added thereto in the amount serially changed in stepwise increments, there appears then a sharp rise of the said strength when the proportion of the added $Ca(OH)_2$ reaches a region near 4% of the Kuroboku, thereby enabling practical use thereof as the subbase course material (Tests E-3 through E-6).

EXAMPLE 5

An experiment was conducted, using electrostatic precipitator dust discharged from community incinerating station and containing considerable heavy metal elements etc. hampering hydraulic cement from hardening by hydration, to study what influence the total amount of the Ingredients A and B replacing the same amount of the cement, used according to this invention as solidifying substances, has upon the solidification strength. Throughout all the tests in this Experiment, it was intended to keep the proportion of all the substances taking part in the chemical reactions always as constant as possible, excepting the said total amount of the Ingredients A and B replacing the same amount of the cement. More particularly, the Ingredients A and B were used always in mutual stoichiometric proportion, and the Ingredient C was used in such amount which is the sum of the amount stoichiometrically corresponding to the total amount of the Ingredients A and B on one hand and the amount corresponding to 5% of the electrostatic precipitator dust on the other hand. Furthermore, if some of the substances used for the solidification contained crystal water, such water was subtracted from the amount of the water positively added, thus to ultimately obtain always the same effective water content. Amount of each of the substances used upon such consideration is shown, together with the test results of the unconfined compressive strength, in Table 5. The methods of preparing the samples for testing the strength of the solidified mass and of measuring the strength were same as in Example 1.

Table 5

| Test number | Amount of the electrostatic precipitator dust used (g) | Kind and amount of cement used (g) | Amount of water added (g) | Kind and amount of the additive used (g) Ingredient (A) | Ingredient (B) | Ingredient (C) | Ratio of total amount of Ingredient A and B to amount of cement (%) | Unconfined compressive strength (kg/cm$^2$) Curing age 7 days | Curing age 28 days |
|---|---|---|---|---|---|---|---|---|---|
| F.1 | 1,000 | Normal portland cement 500 | 600 | 0 | 0 | 0 | 0 | 1.8 | 3.1 |
| F.2 | 1,000 | Fly ash cement 500 | 600 | 0 | 0 | 0 | 0 | 1.1 | 2.0 |
| F.3 | 1,000 | Portland blast-furnace cement 500 | 600 | 0 | 0 | 0 | 0 | 1.3 | 2.7 |
| G.1 | 1,000 | Normal portland cement 477 | 600 | $Al_2(SO_4)_3$ 11.9 | $Na_2CO_3$ 11.1 | $Ca(OH)_2$ 65.4 | 5 | 5.1 | 7.5 |
| G.2 | 1,000 | 435 | 600 | 33.7 | 31.3 | 93.8 | 15 | 8.9 | 13.8 |
| G.3 | 1,000 | 417 | 600 | 43.1 | 39.9 | 105.8 | 20 | 10.5 | 15.0 |
| G.4 | 1,000 | 385 | 600 | 59.7 | 55.3 | 127.5 | 30 | 11.1 | 16.2 |
| G.5 | 1,000 | 357 | 600 | 74.2 | 68.8 | 146.3 | 40 | 6.2 | 9.5 |
| H.1 | 1,000 | Normal | 578 | $FeSO_4.7aq$ | $Na_2CO_3$ | $Ca(OH)_2$ | 10 | 4.9 | 7.9 |

Table 5-continued

| Test number | Amount of the electrostatic precipitator dust used (g) | Kind and amount of cement used (g) | Amount of water added (g) | Kind and amount of the additive used (g) Ingredient (A) | Ingredient (B) | Ingredient (C) | Ratio of total amount of Ingredient A and B to amount of cement (%) | Unconfined compressive strength (kg/cm²) Curing age 7 days | Curing age 28 days |
|---|---|---|---|---|---|---|---|---|---|
| | | portland cement 454 | | 49.6 (27.1) | 18.9 | 76.4 | | | |
| H.2 | 1,000 | 417 | 559 | 89.5 (48.9) | 34.1 | 97.7 | 20 | 6.0 | 9.7 |
| H.3 | 1,000 | 385 | 544 | 124.0 (67.7) | 47.3 | 116.1 | 30 | 6.6 | 10.5 |
| H.4 | 1,000 | 357 | 530 | 154.2 (84.2) | 58.8 | 132.2 | 40 | 4.5 | 6.9 |
| I.1 | 1,000 | Normal portland cement 454 | 579 | Al$_2$(SO$_4$)$_3$ 18aq 43.3 (22.2) | Na$_2$SiO$_3$ Powder 23.8 | Ca(OH)$_2$ 78.8 | 10 | 4.8 | 6.5 |
| I.2 | 1,000 | 385 | 547 | 108.2 (55.5) | 59.5 | 72.2 | 30 | 5.7 | 8.1 |
| I.3 | 1,000 | 357 | 535 | 134.6 (69.1) | 73.9 | 89.8 | 40 | 3.3 | 5.2 |
| J.1 | 1,000 | Normal portland cement 454 | 596 | Al$_2$(SO$_4$)$_3$ 12aq 52.4 (28.5) | Na$_2$CO$_3$ 17.5 | Ca(OH)$_2$ 74.5 | 10 | 6.9 | 10.5 |
| J.2 | 1,000 | 385 | 591 | 130.8 (71.2) | 43.8 | 111.2 | 30 | 10.6 | 14.7 |
| J.3 | 1,000 | 357 | 588 | 162.6 (88.5) | 54.5 | 126.2 | 40 | 5.5 | 8.7 |
| K.1 | 1,000 | Normal portland cement 454 | 578 | Al$_2$(SO$_4$)$_3$ .18aq + FeSO$_4$ 7aq 24.3+22.9 (12.5+12.5) | 21.0 | Ca(OH)$_2$ 78.9 | 10 | 5.4 | 9.4 |
| K.2 | 1,000 | 385 | 544 | 61.9+58.2 (31.8+31.8) | 51.4 | 122.1 | 30 | 6.5 | 12.7 |
| K.3 | 1,000 | 357 | 531 | 76.7+71.2 (39.4+39.4) | 64.2 | 139.7 | 40 | 4.4 | 8.0 |
| L.1 | 1,000 | Fly ash cement 454 | 600 | Al$_2$(SO$_4$)$_3$ 23.9 | Na$_2$CO$_3$ 22.1 | Ca(OH)$_2$ 80.9 | 10 | 3.2 | 7.3 |
| L.2 | 1,000 | 385 | 600 | 59.7 | 55.3 | 127.5 | 30 | 6.0 | 10.2 |
| L.3 | 1,000 | 357 | 600 | 74.2 | 68.8 | 146.3 | 40 | 2.3 | 5.1 |
| M.1 | 1,000 | Portland blast-furnace cement 454 | 600 | Al$_2$(SO$_4$)$_3$ 23.9 | Na$_2$CO$_3$ 22.1 | Ca(OH)$_2$ 80.9 | 10 | 5.9 | 9.5 |
| M.2 | 1,000 | 385 | 600 | 59.7 | 55.3 | 127.5 | 30 | 7.7 | 12.8 |
| M.3 | 1,000 | 357 | 600 | 74.2 | 68.8 | 146.3 | 40 | 4.7 | 7.3 |

Shown in parentheses are the amounts converted to anhydride

From the test results shown in this Table 5, it is seen as follows:

(1) For fixing disposal of the electrostatic precipitator dust discharged from community waste incinerating station, better enhanced solidification effect is realized than simply using alone any cement, as normal portland cement, fly ash cement or portland blast-furnace cement, by replacing a partial amount thereof with same amount of the Ingredients A and B in mutual stoichiometric proportion, and yet better by adding thereto the Ingredient C. and (2) In the mention of item (1) supra, the ratio of the total amount of Ingredients A and B to the amount of remaining actually used cement should be near the range of 25–30% for realizing the highest possible strength, but a degree of effect is seen even when the said ratio is below that range.

EXAMPLE 6

Experiments were conducted to dispose of the four kinds of noxious wastes etc. as specified below, containing toxic heavy metal elements, by fixing same using the three kinds of solidifying compositions also as specified below, with measurements of the strength of the solidified samples and of dissolving-out of the heavy metal elements once fixed in the solidified samples. The methods of preparing the samples and of measuring the strength thereof were same as in Example 1, while the heavy metal elements dissolving-out tests were made in proper accordance with the amended method as prescribed in Official Announcement No. 13 in 1973 of Environment Agency of Japanese Government for the "Method of testing the toxic substances contained in industrial wastes (disposed of in inland reclamation)".

Noxious wastes etc.:

① Electrostatic precipitator dust discharged from community waste incinerating station.
② Community waste incinerated ash
③ Plating factory effluent sludge (having water content of 79%).
④ Artificially prepared Hedro with contaminants (by adding suitable amount of $HgCl_2$, $CdCl_2$, $PbCl_2$, $K_2Cr_2O_7$ and $As_2O_3$, respectively, and by kneading with addition of water to result in the water content of 60%).

Substances for solidification:

① Normal portland cement alone.
② Admixture consisting of: 75 weight parts of normal portland cement, 12.9 weight parts of $Al_2(SO_4)_3$, 12.1 weight parts of $Na_2CO_3$ and 36.8 weight parts of $Ca(OH)_2$.
③ Admixture consisting of: 75 weight parts of normal portland cement, 13.4 weight parts of $Al_2(SO_4)_3\cdot18aq$ (corresponding to 6.9 weight parts of the anhydride), 12.6 weight parts of $FeSO_4\cdot7aq$ (corresponding to 6.9 weight parts of anhydride), 11.2 weight parts of $Na_2CO_3$ and 35.7 weight parts of $Ca(OH)_2$.

Test results of this Example are shown en bloc in Table 6.

ments, thus enabling to attain the aim of fixing up the heavy metal elements using smaller amount of the portland cement than in the case such is used alone. and (2) Property of fixing up $Cr^{6+}$ is especially excellent if $FeSO_4\cdot7aq$ is included in the Ingredient A of the additive used according to this invention.

EXAMPLE 7

An experiment was conducted to solidify with substances for the solidification according to this invention the Hedro artificially prepared with artificial contamination with PCB, with measurements of the strength of the solidified samples and of dissolving-out of PCB once fixed in the solidified samples, in similar manner as in Example 6. The Hedro was artificially prepared to have the water content of 60% and to contain PCB in the proportion of 1000 ppm (on dry-solid basis). Substances used for solidifying same consisted of: normal portland cement as the hydraulic cement; mixture of alum earth and ferrous sulfate, or else ferrous sulfate alone, as the Ingredient A of the additive therefor; soda ash as the Ingredient B thereof; and slaked lime as the Ingredient C thereof. Test results of this Example are shown in Table 7.

Table 7

| Test number | Amount of the artificial Hedro used (g) | Amount of the cement Used (g) | Ingredient (A) $Al_2(SO_4)_3$ .18H$_2$O | Ingredient (A) $FeSO_4$ .7H$_2$O | Ingredient (B) $Na_2CO_3$ | Ingredient (C) $Ca(OH)_2$ | Amount of PCB dissolved out (mg/l) | Unconfined compressive Strength (kg/cm$^2$) |
|---|---|---|---|---|---|---|---|---|
| R-1 | 1,000 | 300 | — | — | — | — | 0.043 | 13.2 |
| R-2 | 1,000 | 250 | 10.3 | 10.7 | 13.0 | 16.0 | 0.015 | 19.6 |
| R-3 | 1,000 | 250 | — | 26.1 | 10.0 | 13.9 | 0.008 | 15.4 |

From the test results shown in this Table 7, it is seen

Table 6

| Kind of the noxious wastes etc. | Test number | Kind of the substances for solidification | Ratio of the amount of the substances for solidification to the amount of the noxious wastes etc. (%) | Ratio of the amount of added water to the amount of the noxious wastes etc. (%) | Unconfined compressive strength of the solidified mass at the curing age of 28 days (kg/cm$^2$) | Hg | Cd | Pb | Cr$^{6+}$ | As |
|---|---|---|---|---|---|---|---|---|---|---|
| | N.1 | not added | — | — | — | ND | 59 | 25 | ND | ND |
| ① | N.2 | ① | 50 | 60 | 3.1 | ND | 0.011 | 0.52 | 0.20 | ND |
| | N.3 | ② | 50 | 60 | 13.2 | ND | 0.004 | 0.13 | ND | ND |
| | 0.1 | not added | — | — | — | ND | 0.31 | 0.76 | ND | ND |
| ② | 0.2 | ① | 50 | 60 | 5.2 | ND | ND | 0.24 | 0.01 | ND |
| | 0.3 | ② | 50 | 60 | 22.3 | ND | ND | 0.03 | ND | ND |
| | P.1 | not added | — | — | — | 4.33 | 0.41 | 0.03 | 2.74 | ND |
| ③ | P.2 | ① | 50 | 0 | 3.8 | 0.002 | ND | 0.03 | 1.80 | ND |
| | P.3 | ② | 50 | 0 | 10.2 | ND | ND | 0.01 | ND | ND |
| | Q.1 | not added | — | — | — | 5.10 | 17.88 | 23.55 | 42.28 | 20.87 |
| ④ | Q.2 | ① | 30 | 0 | 15.4 | 0.005 | 0.06 | 0.41 | 21.31 | 0.91 |
| | Q.3 | ② | 30 | 0 | 19.6 | 0.001 | 0.05 | 0.10 | ND | 0.13 |

(ND standing for "not detected")

From the test results shown in this Table 6, it is seen as follows:

(1) In comparison with the counterparts obtained by using simply the normal portland cement alone, the solidified masses obtained according to this invention generally have higher solidification strengths and are better in the property of fixing up the heavy metal elements as follows: Namely, better results of fixing up PCB is realized by using the substances for the solidification according to this invention than using normal portland cement alone for the solidification. The result is especially excellent when ferrous sulfate is used in large proportion in the Ingredient A.

EXAMPLE 8

It has been supposed to be an unrealistic idea, and thus disregarded, to improve soft formation of peat layer by consolidating same to a sufficient degree enough to be utilized as firm civil engineering foundation. In defiance hereof, an experiment was conducted as now described by way of example, to consolidate and improve the peat according to this invention.

The peat used in this experiment was obtained in Tomakomai, Hokkaido, Japan, and had the water content of 83.3% and the weight reduction upon heating (for 120 minutes at 600° C.) of 70.1%. Substances used for consolidating same consisted of: normal portland cement; $FeSO_4.7aq$ as the Ingredient A of the additive therefor; $Na_2CO_3$ as the Ingredient B thereof; and incinerated ash of sewage sludge, containing lime in concentration of 39.7% calculated as CaO, as the Ingredient C thereof. In order to provide blank or reference, tests were simultaneously conducted also in the cases using simply the normal portland cement alone on one hand and using only the Ingredient C in addition thereto on the other hand. The methods of preparing the test samples for testing the strength of the consolidated mass and of measuring the strength were same as in Example 1. Test results of this Experiment are shown in Table 8.

(2) Instead of using the normal portland cement together with only the Ingredient C as additive therefor, if use is made of the substances for the consolidation according to this invention, in the amount same as before, then conspicuous enhancement of the consolidation effect is seen, thus enabling practically to improve the peat layer, namely to consolidate same well to a sufficient degree enough to be utilized as firm civil engineering foundation (Tests S-8, 9, 11 and 12).

EXAMPLE 9

An experiment was conducted to solidify canal bottom mud containing mercury contaminant, using two kinds of substances for the solidification according to this invention on one hand and normal portland cement on the other hand, respectively, and to compare the resultant solidification strength and mercury fixation effect therebetween. The bottom mud had the water content of 69.0%, the weight reduction upon heating (for 120 minutes at 600° C.) of 4.2%, the unit weight of 1.252 tons/m³ and the total mercury content of 10.5 ppm on solid matter basis. Substances used for solidifying same consisted of: normal portland cement; either by-product ferrous sulfate recovered from iron and steel acid washing effluent, containing $FeSO_4.7aq$ in about 96% concentration, or else crude alum earth containing $Al_2(SO_4)_3.18aq$ in about 83% concentration, as the Ingredient A of the additive therefor; commercially available soda ash as the Ingredient B thereof; and Table 8

| Test number | Amount of the peat used (g) | Amount of the cement used (g) | Ingredient (A) FeSO.7aq | Ingredient (B) Na₂CO₃ | Ingredient (C) Incinerated ash of sewage sludge | Unconfined compressive strength (kg/cm²) Curing age 7 days | Curing age 28 days |
|---|---|---|---|---|---|---|---|
| S.1 | 1,000 | 200 | 0 | 0 | 0 | not consolidated | not consolidated |
| S.2 | 1,000 | 200 | 0 | 0 | 167 | 0.2 | 0.3 |
| S.3 | 1,000 | 200 | 0 | 0 | 334 | 0.9 | 1.4 |
| S.4 | 1,000 | 300 | 0 | 0 | 0 | not consolidated | 0.1 |
| S.5 | 1,000 | 300 | 0 | 0 | 167 | 0.2 | 0.4 |
| S.6 | 1,000 | 300 | 0 | 0 | 334 | 1.0 | 1.6 |
| S.7 | 1,000 | 154 | 33 | 13 | 0 | 0.5 | 1.0 |
| S.8 | 1,000 | 154 | 33 | 13 | 167 | 0.9 | 2.1 |
| S.9 | 1,000 | 154 | 33 | 13 | 334 | 1.8 | 3.9 |
| S.10 | 1,000 | 231 | 49.5 | 19.5 | 0 | 0.8 | 1.8 |
| S.11 | 1,000 | 231 | 49.5 | 19.5 | 167 | 1.9 | 4.0 |
| S.12 | 1,000 | 231 | 49.5 | 19.5 | 334 | 2.5 | 5.6 |

From the test results shown in this Table 8, it is seen as follows:

(1) If simply normal portland cement is used alone, no substantial consolidation effect can be expected even when the same is used up to 30% of the peat (Tests S-1 and S-4), but mere addition only of the Ingredient C as additive for the normal portland cement amy bring forth the expected consolidation effect to a degree according to the amount of such addition (Tests S-2, 3, 5 and 6). and incinerated ash of sewage sludge, containing lime in concentration of 46.3% calculated as CaO. Proportions of them as actually used are shown in Table 9. Solidification strength was measured in accordance with the methods of preparing the test samples of the solidified mass and of measuring the strength as described in Example 1, and fixation effect was measured as leachate concentration in proper accordance with the method as described in Example 6, with respect to the samples used for the said strength testing at the curing age of 28 days. Test results of this Experiment are shown in Table 9.

Table 9

| Test number | Amount of the bottom mud used (g) | Amount of the cement used (g) | Amount of the additive used (g) | | | Ingredient (C) Incinerated ash of sewage sludge | Unconfined compressive strength (kg/cm$^2$) | | Total mercury concentration dissolved out (mg/l) |
|---|---|---|---|---|---|---|---|---|---|
| | | | Ingredient (A) | | Ingredient (B) | | Curing age 7 days | Curing age 28 days | |
| | | | FeSO$_4$ .7aq | Al$_2$(SO$_4$)$_3$ .18aq | Na$_2$CO$_3$ | | | | |
| T.1 | 900 | 90 | 0 | 0 | 0 | 0 | not solidified | not solidified | 0.015 |
| T.2 | 900 | 180 | 0 | 0 | 0 | 0 | not solidified | not solidified | 0.018 |
| T.3 | 900 | 90 | 0 | 0 | 0 | 270 | 2.7 | 6.2 | 0.002 |
| T.4 | 900 | 180 | 0 | 0 | 0 | 270 | 4.0 | 11.2 | 0.003 |
| T.5 | 900 | 69 | 0 | 14 | 7 | 270 | 4.8 | 10.4 | ND |
| T.6 | 900 | 138 | 0 | 28 | 14 | 270 | 9.0 | 17.5 | ND |
| T.7 | 900 | 69 | 15 | 0 | 6 | 270 | 2.5 | 7.4 | ND |
| T.8 | 900 | 138 | 31 | 0 | 11 | 270 | 8.7 | 15.9 | ND |

By the way, a reference test was also made, to measure total mercury concentration dissolved out, in proper accordance with the method as described in Example 6, with respect to dry mud obtained by air-drying, at normal temperature, the bottom mud used in this Experiment, and the result was obtained as 0.003 mg/l. From the test results shown in this Table 9, it is seen as follows:

(1) The bottom mud can not be solidified by using simply normal portland cement alone in the amount of 20% thereof. Still more, such addition simply of normal portland cement alone shows even adverse effect with respect to total mercury concentration dissolved out, which is thus rather higher in such case than in the case of the dry mud without any addition thereto at all (Tests T-1 and T-2).

(2) Use of incinerated ash of sewage sludge together with the normal portland cement enables the solidification, but no particular effect is seen with respect to fixation of mercury, with the total mercury concentration dissolved out in such case thus remaining substantially same as in the said case of the dry mud without any addition thereto at all (Tests T-3 and T-4). and (3) Use of the substances for the solidification according to this invention, in the total amount same as in the case of item (2) supra, remarkably inhances both the solidification strength and the mercury fixation effect (Tests T-5 through T-8).

EXAMPLE 10

An experiment was conducted to solidify river bottom mud obtained in Hachiman-bori, Shiga Prefecture, Japan, using the substances for the solidification according to this invention, to a sufficient degree enough to be utilized as land filling material. The river bottom mud had the water content of 81.0%, the weight reduction upon heating (for 120 minutes at 600° C.) of 13.3%, the unit weight of 1.121 tons/m$^3$ and contained so much humic soil that it would not be solidified even with use of normal portland cement in the amount of 30% thereof. Substances used for solidifying same according to this invention consisted of the normal portland cement and the additive therefor with the Ingredients A, B and C just same as described in Example 9, excepting the further addition of slaked lime which is commercially available for use of the plasterers and which enriched the said Ingredient C. Proportions of them as actually used are shown in Table 10. The methods of preparing the samples for testing the strength of the solidified mass and of measuring the strength were same as in Example 1. Test results of this Experiment are shown in Table 10.

Table 10

| Test number | Amount of the bottom mud used (g) | Amount of the cement used (g) | Amount of the additive used (g) | | | Ingredient (C) | | Unconfined compressive strength (kg/cm$^2$) | |
|---|---|---|---|---|---|---|---|---|---|
| | | | Ingredient (A) | | Ingredient (B) | Incinerated ash of sewage sludge | Slaked lime for plastereres | Curing age 7 days | Curing age 28 days |
| | | | FeSO$_4$ .7aq | Al$_2$(SO$_4$)$_3$ .18aq | Na$_2$CO$_3$ | | | | |
| U.1 | 800 | 240 | 0 | 0 | 0 | 0 | 0 | not solidified | not solidified |
| U.2 | 800 | 240 | 0 | 0 | 0 | 160 | 0 | 0.4 | 0.7 |
| U.3 | 800 | 184 | 40 | 0 | 16 | 130 | 30 | 1.8 | 2.9 |
| U.4 | 800 | 184 | 0 | 38 | 18 | 130 | 30 | 2.0 | 3.2 |

From the test results shown in this Table 10, it is seen as follows:

(1) The river bottom mud can not be solidified even with use of normal portland cement in the amount of 30% thereof (Test U-1).

(2) A degree of solidification strength is obtained by the use of incinerated ash of wewage sludge, in the amount of 20% of the river bottom mud, in addition to the normal portland cement used in the same amount of item (1) supra (Test U-2). and (3) Replacing the normal portland cement and the incinerated ash of sewage sludge, used in the said amount of item (2) supra, by the substances for solidification according to this invention, in the same amount, remarkable enhancement is seen in the solidification strength (Tests U-3 and U-4).

EXAMPLE 11

An experiment was conducted to solidify harbor bottom mud containing PCB contaminant, using substances for the solidification according to this invention, with measurements of solidification strength and of PCB fixation effect. The harbor bottom mud contained PCB in the concentration of 47.0 ppm (on dry mud basis) and had the water content of 83.0% and the weight reduction upon heating (for 120 minutes at 600° C.) of 38.8%. Substances used for solidifying same according to this invention were same as in Example 8, and with the finding that the incinerated ash of sewage sludge used as the Ingredient C of the additive contained Pb in 221 ppm, Cd in 3.32 ppm, total Hg less than 0.0005 ppm, Cu in 2,490 ppm and total Cr in 2,170 ppm, the effect fixing up these heavy metal elements in the solidified mass was also measured. The methods of preparing the test samples of the solidified mass and of measuring the strength, and the method of the dissolving-out tests of PCB and the heavy metal elements, were same as in Examples 1 and 6, respectively. Test results of this Experiment are shown in Table 11.

From the test results shown in this Table 11, it is seen as follows:

(1) If ferrous sulfate is selected as the Ingredient A of the additive used in the substances for solidification according to this invention, better effect is seen with respect to both PCB fixation effect and solidification strength than in the case of using simply the normal portland cement alone (Tests V-1 and V-3). and (2) Heavy metal elements contained in the incinerated ash of sewage sludge, used as the Ingredient C of the additive in the substances for solidification according to this invention, are fixed up in the solidified mass and practically do not dissolve out (Test V-3).

EXAMPLE 12

An experiment was conducted to consolidate peat obtained in Sashiohgi, Saitama Prefecture, Japan, using the substances for the consolidation according to this invention. The peat had the water content of 84.9%, the weight reduction upon heating (for 120 minutes at 600° C.) of 71.7% and the unit weight of 1.013 tons/m³. Substances used for consolidating same according to this invention were same as described in Example 9, excepting the further addition of natrium silicate ($Na_2SiO_3$) used as the Ingredient B thereof. The methods of preparing the test samples of the consolidated mass and of measuring the strength are same as in Example 1. Test results of this Experiment are shown in Table 12.

Table 12

| Test number | Amount of the peat used (g) | Amount of the cement used (g) | Ingredient (A) $FeSO_4$.7aq | Ingredient (A) $Al_2(SO_4)_3$.18aq | Ingredient (B) $Na_2CO_3$ | Ingredient (B) $Na_2SiO_3$ | Ingredient (C) Incinerated ash of sewage sludge | Unconfined compressive strength (kg/cm²) Curing age 7 days | Unconfined compressive strength (kg/cm²) Curing age 28 days |
|---|---|---|---|---|---|---|---|---|---|
| W.1 | 900 | 180 | 0 | 0 | 0 | 0 | 0 | not consolidated | not consolidated |
| W.2 | 900 | 180 | 0 | 0 | 0 | 0 | 270 | 0.9 | 2.3 |
| W.3 | 900 | 138 | 0 | 28 | 14 | 0 | 270 | 3.0 | 7.8 |
| W.4 | 900 | 138 | 31 | 0 | 11 | 0 | 270 | 3.9 | 6.8 |
| W.5 | 900 | 138 | 0 | 27 | 0 | 15 | 270 | 4.2 | 5.9 |
| W.6 | 900 | 130 | 29 | 0 | 0 | 13 | 270 | 4.8 | 7.0 |

From the test results shown in this Table 12, it is seen as follows:

(1) The peat can not be consolidated even with use of normal portland cement in the amount of 20% of the peat, but a degree of consolidation effect is seen if the Ingredient C of the additive is used in addition thereto (Tests W-1 and W-2). and Table 11

| Test number | Amount of the bottom mud used (g) | Amount of the cement used (g) | Ingredient (A) $FeSO_4$.7aq | Ingredient (B) $NaCO_3$ | Ingredient (C) Incinerated ash of sewage sludge | Unconfined compressive strength (kg/cm²) Curing age 7 days | Unconfined compressive strength (kg/cm²) curing age 28 days | Concentration of the toxic substances dissolved out at the curing age of 28 days (mg/l) PCB | Pb | total Cd | total Hg | Cu | total Cr |
|---|---|---|---|---|---|---|---|---|---|---|---|---|---|
| V.1 | 1,000 | 200 | 0 | 0 | 0 | 0.5 | 0.8 | 0.026 | 0.01 | ND | ND | ND | ND |
| V.2 | 1,000 | 154 | 33 | 13 | 0 | 0.7 | 1.9 | <0.001 | ND | ND | ND | ND | ND |
| V.3 | 1,000 | 154 | 33 | 13 | 167 | 2.3 | 3.8 | <0.001 | ND | ND | ND | ND | ND |

(2) Instead of such addition only of the Ingredient C of the additive for the portland cement as in item (1) supra, if use is made of the substances for the consolidation according to this invention, in the amount same as before, then conspicuous enhancement of the consolidation effect is seen (Tests W-3 through W-6).

Being described in detail as above, this invention uses, together with the conventional hydraulic cement, the particular additive therefor consisting only of a combination of quite economically and easily available substances, yet thereby enabling to solidify and make harmless, by such fixation, the noxious wastes etc. containing toxic contaminants to affect the ecological system of the environment and sometimes also substances hampering the hydraulic cement from hardening by hydration, thus is a very useful invention. The value of this invention is especially prominent today in the trend of ever increasing social needs for solving the problem of protecting the environment and of recycling the wastes as usable resources.

In actually practicing this invention, it is possible either to mix up beforehand the hydraulic cement and the additive therefor, thus providing the material for solidifying the noxious wastes etc., or else to prepare up beforehand only the said additive, thus providing such as is ready for use as additive for the hydraulic cement for the solidification. Obviously, it is further possible to add to and mix up with the noxious wastes etc., in situ upon working of solidification disposal thereof, the hydraulic cement and the ingredients of the additive therefor, one by one in any suitable consecutive order.

We claim:

1. A method for solidifying or consolidating noxious waste comprising admixing said noxious waste with hydraulic cement, and additive mixture consisting of (A) and (B) wherein:
   (A) is at least one sulfate selected from the group consisting of aluminum sulfate, alum, ferrous sulfate and ferric sulfate;
   (B) is at least one alkaline metal salt selected from the group consisting of alkaline metal carbonate, bicarbonate and silicate;
   water as needed to cause solidification or consolidation of the resulting mixture; and
   (A) and (B) being present in an amount substantially corresponding to the mutual stoichio metric proportions.

2. A composition for solidifying or consolidating noxious wastes consisting of hydraulic cement, and
   (A) at least one sulfate selected from the group consisting of aluminum sulfate, alum, ferrous sulfate and ferric sulfate; and
   (B) at least one alkaline metal salt selected from the group consisting of alkaline metal carbonate, bicarbonate and silicate (A) and (B) being present in an amount substantially corresponding to these mutual stoichiometric porportions.

3. The composition of claim 2 containing the additional ingredient (C) which is a hydroxide or oxide of an alkaline earth metal in an amount at least corresponding to the sum of stoichiometric amounts to react with (A) and (B) respectively.

4. A composition for solidifying or consolidating noxious wastes consisting of
   (A) at least one sulfate selected from the group consisting of aluminum sulfate, alum, ferrous sulfate and ferric sulfate; and
   (B) at least one alkaline metal salt selected from the group consisting of alkaline metal carbonate, bicarbonate and silicate, (A) and (B) being present in an amount substantially corresponding to these mutual stoichiometric proporations.

5. The composition of claim 4 consisting the additional ingredient (C) which is a hydroxide or oxide of an alkaline earth metal in an amount at least corresponding to the sum of stoichiometric amounts to react with (A) and (B) respectively.

6. The method of claim 1 wherein noxious waste contains a substantial amount of a substance hampering the hydraulic cement from hardening by hydration and/or there is shortage of calcium hydroxide yielded in the hydration process of the hydraulic cement for stoichiometrically reacting with the said additive consisting of (A) and (B), comprising adding to said additive
   (C) a hydroxide or oxide of an alkali earth metal.

7. The method of claim 1 or 6 wherein the total amount of (A) and (B), on the anhydride basis, is 5%–30% of said hydraulic cement.

8. The method of claim 1 or 6 wherein the total amount of (A) and (B), or the anhydride basis, is 25% to 30% of said hydraulic cement.

9. The method of claim 1 wherein incinerated ash of sewage sludge is the source of at least a part of the said (C).

10. The method of claim 6 or 7, wherein each ingredient of said additive is reduced or omitted where the said noxious wastes already initially contain substances of the same kind as the said each ingredient, the reduction being by the amount corresponding to the amount of the said substances initially present.

11. The composition of claim 3 wherein incinerated sewage ash is used as at least part of the ingredient (C).

12. The composition of any one of claims 2, 3 and 11 wherein the proportion of (A) to (B) substantially corresponds to the mutual stoichiometric proportions thereof.

13. The composition of claim 3 wherein (C) is present in at least an amount sufficient to react with the stoichiometric amounts of (A) and (B).

14. The composition of any one of claims 2, 3 and 11 wherein the total amount of (A) and (B), on the anhydride basis, is 5–30% of the hydraulic cement.

15. The composition of any one of claims 2, 3 and 11 wherein the total amount of (A) and (B), on the anhydride basis, is 25% to 30% of the hydraulic cement.

16. The composition of claim 4 wherein incinerated sewage ash is used as at least part of the ingredient (C).

17. The composition of any one of claims 4, 5 and 16 wherein the proportion of (A) to (B) substantially corresponds to the mutual stoichiometric proportions thereof.

18. The composition of claim 5 wherein (C) is present in at least an amount sufficient to react with the stoichiometric amounts of (A) and (B).

19. The composition of any one of claims 4, 5 and 16 wherein the total amount of (A) and (B), on the anhydride basis, is 5–30% of the hydraulic cement.

20. The composition of any one of claims 4, 5 and 16 wherein the total amount of (A) and (B), on the anhydride basis, is 25% to 30% of the hydraulic cement.

21. The method of claim 1 wherein said noxious waste contains a compound of a heavy metal.

* * * * *